United States Patent Office 3,552,230
Patented Jan. 5, 1971

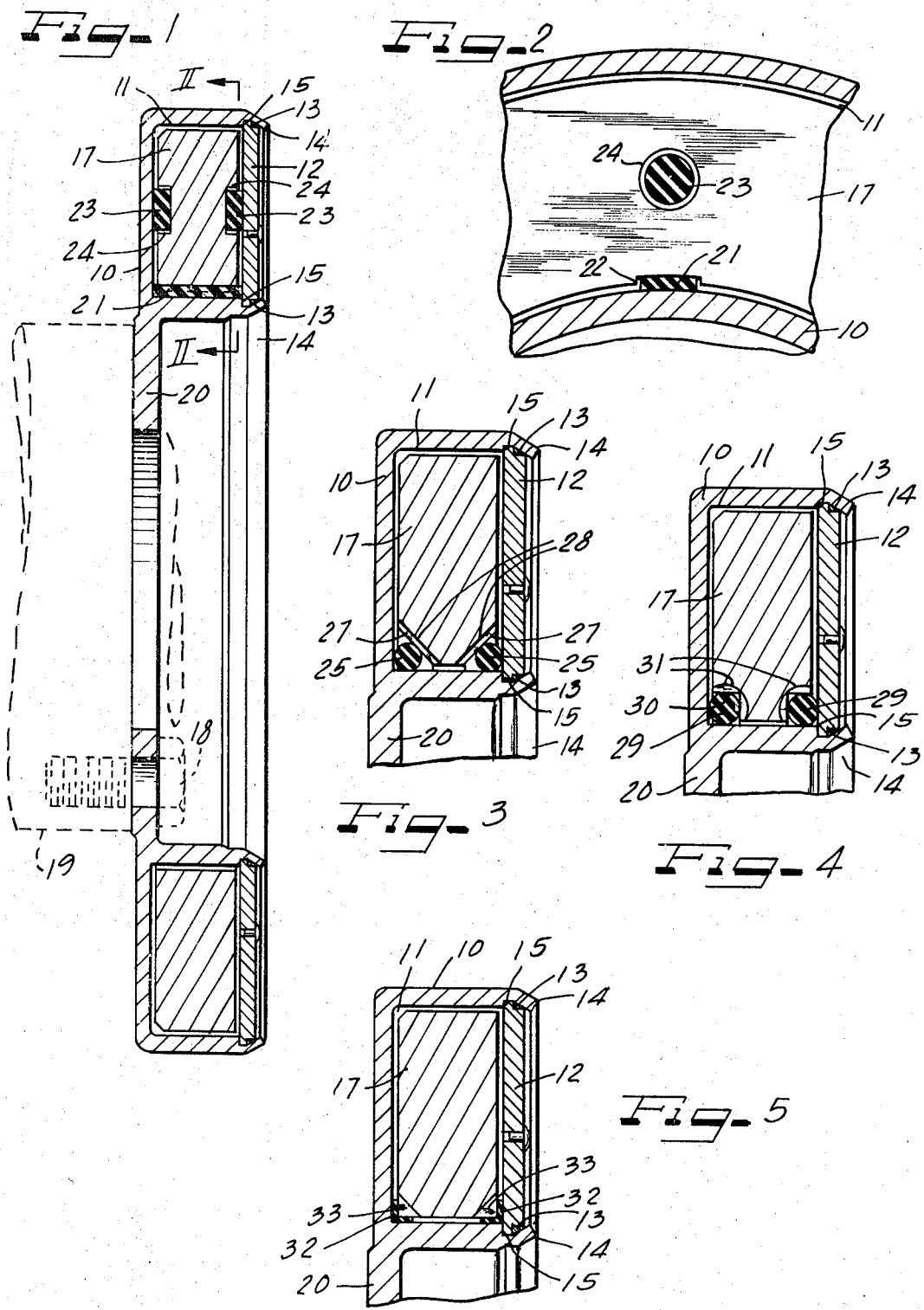

3,552,230
OPTIMUMLY TUNED AND EFFICIENT VISCOUS DAMPERS
Ronald L. McLean, Tonawanda, N.Y., assignor to Houdaille Industries, Inc., Buffalo, N.Y., a corporation of Delaware
Filed Jan. 8, 1969, Ser. No. 789,800
Int. Cl. F16f 15/10
U.S. Cl. 74—574                12 Claims

ABSTRACT OF THE DISCLOSURE

A vibration damper has means for attaching it to a structure subject to vibrations, i.e., a crankshaft, and comprising relatively movable members one of which is an inertia mass and one of which defines a housing relative to the other member to retain a viscous damping fluid in a shear film coupling between the members, elastomeric tuning spring bearing means under precompression between and frictionally engaging with the members functioning to effect tuning and damping by resilient flexing spring action of the bearing means in addition to viscous shear damping by said viscous fluid and to enable guided stress relief safety relative sliding displacement of the members on the bearing means, while constantly maintaining the shear film spaced relation between the members. Efficient tuning and shear damping by a viscoelastic material is enabled.

---

This invention relates to viscous dampers or vibration absorbers and is especially useful in dampers of the torsional vibration absorbing type operative on internal combustion engine and like drive shafts.

Vibration dampers of the type operating on the principle of resistance to shearing of a coupling film of viscous fluid between relatively movable members, one of which is an inertia weight, have been provided with metal or plastic bearings to maintain the damper members spaced apart and to prevent metal-to-metal contact, especially where silicone is used as the damping medium and the damper members are of a ferrous material. However, it has been found that the bearing clearances subject the viscous fluid to very severe shearing as compared with the working gap or shear film. There may be a tendency toward fluid breakdown in the bearing clearances and especially where the bearing areas are of substantial size and the damper is required to function under demanding working conditions.

It has been proposed to provide tuning and damping in a torsional damper package by using viscoelastic (having shear elastic as well as viscous shear properties) fluids. Heretofore, the aim has been to accomplish this by a combination of the standard viscous damper bearing geometry plus thicker working area gaps. The working gaps are about ten times the nominal bearing gaps. As a result, the bearing area contribution is a major portion of the damper torque output. Since the shearing strains on the fluid in the bearing area are extremely high, the bearing area torque output is largely dissipative, regardless of the fluid used. The same fluid, in the working areas, will provide elastic (tuning) and damping (dissipative) properties as desired. However, a damper designed in this manner will behave as a standard viscous damper, because the total damping (due to bearings plus working areas) outweighs the elastic effect of the working area. No satisfactory means have heretofore been provided to obtain efficient tuning by means of inherent dynamic shear elasticity of high viscosity fluids.

There has also been the liability of contaminating debris caused by wearing or galling of contacting and bearing metal surfaces and premature damper aging and loss of function, such as by gelation of the silicone damping fluid. With metal bearings, the relative position of inertia member and housing can change, causing various operational disturbances such as variations in shear film spacing, imposition of variable frictional reactions and the like. Tolerance limitations create a high production and cost problem. Excessive testing requirements have had to be met and there has been high rejection rate due to insufficient or excessive damping, etc. As a safety feature adding to production costs, it has been common to plate at least one of the relatively movable damper members, were made from a ferrous material, with a protective material such as cadmium.

Often it is desirable to provide in the damper means for tuning the same to damp certain natural frequencies in the system to which applied. For example, in a crankshaft it is desirable to provide tuning to diminish torsional vibration amplitudes. For this purpose, various metal and non-metal springs have been proposed such as bonded rubber spring connections. Tuning with metal springs tends to be costly. Bonded elastomeric springs have various deficiencies such as vulnerability of the elastomer-to-metal bond to attack by the damping fluid, failure of the springs due to hysteresis deterioration, and the like. Such springs function with the inertia mass to operate in parallel with the damping coupling and this presents certain problems.

All of the foregoing and other objections and shortcomings of prior arrangements are overcome by the present invention, according to the principles of which elastomeric bearings under compression are utilized not only to maintain constant shear film spacing between the damper members, but also to eliminate or at least minimize to a negligible level the intersurface clearance between the bearings and the engaged member, to serve as tuning springs and to provide stress relief frictional sliding displacement safety means.

Accordingly, a general object of the invention is to provide novel viscous damper bearing means.

Another object of the invention is to provide novel elastomeric bearing and tuning means for viscous dampers.

A further object of the invention is to provide a new and improved tuned vibration damper construction efficiently utilizing the viscous shear damping and elastic tuning capabilities of high viscosity damping media.

Still another object of the invention is to provide new and improved bearing means for tuned viscous shear dampers.

A still further object of the invention is to provide a new and improved tuned viscous shear damper provided with novel elastomeric combination bearing, centering, spring and stress relief means.

It is also an object of the invention to provide a novel vibration damper affording substantial economies in construction, and in which tolerance requirements may be relaxed, less attention need be given to internal surface finishing, metal bearings are eliminated, plating or otherwise protecting opposed ferrous surfaces in a silicone filled damper avoided, bearing surface contact minimized, improvements in operating efficiency effected, damper life extended, and damper balance significantly improved.

Other objects, features and advantages of the present invention will be readily apparent from the following detailed description of certain preferred exemplifications thereof taken in conjunction with the accompanying drawing, in which:

FIG. 1 is a diametrical section view in an axial plane through a torsional vibration damper embodying features of the invention;

FIG. 2 is an enlarged fragmentary sectional elevational view taken substantially on the line II—II of FIG. 1;

FIG. 3 is a fragmentary diametrical section view through a modification of the damper.

FIG. 4 is a similar view showing another modification; and

FIG. 5 is a similar view showing a further modification.

Principles of the present invention are applicable to numerous and varied types of viscous vibration dampers, but for illustrative purposes have been illustrated in torsional vibration dampers, and more particularly dampers of the type especially constructed and arranged to be applied concentrically to the driving or crank shafts of internal combustion engines and the like. During operation of such engines the shafts are subject to various torsionally vibratory influences which often result in measurable and frequently predictable vibration amplitudes. It is to meet the full range of torsional vibration susceptibility of any given mass in the structure, such as a drive shaft, subject to vibrations and including any peculiar vibration amplitudes, that the present invention is directed.

In a desirable form, a torsional vibration damper having optimum tuning and damping capabilities in a minimum size to meet operating requirements for the mass to be damped comprises an annular housing 10 constructed with minimum seams or joints. Preferably it comprises a malleable casting within which is an annular generally rectangular transversely cross sectioned working chamber 11 opening from one side and closed by an annular closure plate 12 hermetically sealed by respective annular static seals 13 under compression by rolled over retaining flanges 14 clamping the respective margins of the plate against shoulders 15 about the radially inner and outer sides of the opening to the chamber. Surfaces of the housing 10, and including the closure plate 12, defining the chamber 11 provide working surfaces which are parallel to confronting surfaces of an inertia mass member 17 in the form of a flywheel which is relatively rotatably mounted within the chamber 11. Spacing between radially inner and outer cylindrical opposed working surfaces of the housing and the inertia members, and between the axially facing parallel working surfaces of the housing and the inertia member, are in shear film spaced relation to one another, having regard to a viscous damping medium such as a suitable grade and viscosity of silicone, silicone containing submicroscopic silicon carbide whiskers coated with amorphous silica such that a relatively low cost and low viscosity fluid assumes viscosity characteristics of a much more viscous fluid, polyisobutylene, or like material filling the spaces. Attachment of the damper as by means of bolts 18 concentrically onto a shaft 19 is effected through a radially inward integral flange 20 on the housing.

According to the present invention, all of the objections to conventional bearings, or bearing surfaces between the housing 10 and the inertia mass 17 of the damper are overcome by the use of elastomeric bearings for not only centering the flywheel inertia mass 17 radially, but also axially within the housing. These bearings are desirably constructed and arranged to occupy only a small fraction of the total surface area between confronting surfaces within the damper, and with a thickness which is greater than but not much greater than the shear film spacing. The bearings need not be and desirably are not bonded to either the housing or the inertia mass but are under sufficient compression between the damper members to eliminate bearing surface clearance. By reason of compression grip of the elastomeric bearings by and between the damper members, the bearings function at least to some extent as damper springs to provide tuning that may be useful alone or in conjunction with or in addition to other tuning in the damper system. By having the bearings frictionally slideably engaged with the confronting surfaces of at least one of the damper members, safety fuse relative sliding of such member and the bearings is permitted for relative movement of the damper members when subjected to large or unusual forces which might overstress bonded elastomeric tuning springs. During sliding relative movement, the resulting friction forces do not degrade the vibration absorbing performance because such forces act in series with the elastomeric spring action of the bearing. Because of the tight engagement between the elastomeric bearings and the damper members only the barest lubricating smear of the damping medium may, if at all, work in between the bearing surfaces, so there is no viscous shearing effect in this area. As a result, vibration absorption of the damper is substantially invariable because the inertia mass is maintained thoroughly centered within the chamber of the housing and there are no metal-to-metal contacts permitted to disturb proper functioning. The viscous fluid has longer life because it is worked uniformly and at reasonably low shearing stresses throughout the damper and there is nearly complete absence of the usual bearing contamination. All this is accomplished without any need for plating or otherwise treating any of the confronting metal surfaces within the damper. Finishing of the confronting working surfaces of the damper need not be as critically performed as on prior dampers, and there is greater latitude in manufacturing tolerances. Unbalance is virtually eliminated.

In one desirable form of the damper, as shown in FIGS. 1 and 2, the compressed elastomeric bearings comprise a series of circumferentially spaced bearings 21 between the inner perimeter of the inertia member 17 and the housing 10 retained in their circumferential positions with the inertia member within respective sockets 22 in the inner periphery of the inertia member. Axial centering of the inertia member within the working chamber 11 is maintained by respective series of circumferentially spaced elastomeric bearing member disks 23 retained in their circumferential relation to the inertia member 17 within respective sockets 24 in the opposite axial surfaces of the inertia member. There may be as many sets of the bearing members 21, 23 as deemed desirable about the inertia member 17, but at least three sets are desirable at 120° intervals for adequate centering. These bearings may be made of any suitable elastomeric materials such as chloroprene, isobutylene-isoprene, nitrile butadiene, fluorocarbon, fluorosilicone, ethylene-propylene, natural or synthetic rubber, styrene-butadiene, and the like, having the desired durometer, elasticity, damping medium compatibility, and like attributes. As installed, the bearings 21, 23 are placed under from five percent to twenty-five percent precompression. While the bearings 21, 23 are held with the inertia member 17, they are frictionally slideably engaged with the confronting working surfaces of the housing. It has been found possible to keep the torque contribution of the bearings to less than five percent of the total absorber capacity. By having the elastomeric spring bearings as close as practicable to the inside radius of the flywheel inertia member 17 influence on damper torque is minimized. Because of the limited areas of circumferential contact by the bearings 21, 23, there is freedom for equalization flow of the viscous damping medium to all areas of the shear film spacing gaps between the housing members and the inertia mass, and maximum viscous damping utility of the confronting spaced surfaces of the damper members.

In a modified arrangement as depicted in FIG. 3, the damper has elastomeric bearings only between radially inner portions of the ring inertia member 17 and the confronting portions of the housing within the chamber 11. For this purpose respective O-ring type elastomeric members 25 are engaged in radial and axial centering relation to the damper members, being in this instance engaged with respective chamfered or diagonal relatively diverging radially inwardly and axially outwardly facing respective annular bearing surfaces 27 on the inertia member and confronting surfaces within the respective inner reentrant corners defined by the walls of the housing. If preferred, the bearing members 25 may be formed from strips of material rather than preformed rings. By being under precompression on the order of the precompression described for the bearings 21 and 23, the same attributes are attained as to centering and stress relief safety relative sliding of at least one of the members, and in this instance the inertia member 17, on the bearing spring members 25 while attaining some series tuning. In order to assure free circulation of damping medium to the inner perimeter of the inertia member 17, respective circulation notches 28 are desirably provided transversely across the bearing surfaces 27 to bypass the spring bearing members 25.

In FIG. 4, another arrangement utilizing generally O-ring bearing members 29 is shown wherein the annular inertia ring member 17 has reentrant angular respective inner corner grooves 30 receptive of the bearing rings which are under precompression sliding bearing tuning spring engagement in the grooves and with opposed bearing surfaces of the reentrant corners provided by the walls of the housing defining the inner perimeter portion of the chamber 11. For circulation of damping medium to the inner perimeter of the ring inertia member 17, respective transverse grooves 31 bypassing the bearing members 29 may be provided. Frictional resistance to relative sliding displacement of the damper members on the centering bearing rings 29 is substantially equal with respect to the inertia member and the housing because of the dual bearing surfaces on each of the damper members in engagement with the bearing rings.

A further and relatively simple arrangement is shown in FIG. 5 in which inside corners of the inertia ring member 17 engage with elastomeric bearing rings 32 of generally complementary angle-shape transverse cross-section engaging in complementary relation within the inside angles within the chamber 11. Although the members 32 may be constructed as complete rings, they may also be in the form of extrusion strips placed as shown, and in either instance under desirable precompression to afford the desired centering and to maintain constantly the shear film spaced relation between the members and the tuning spring effect. Stress relief sliding of at least one of the damper members is permitted, in this instance the inertia ring, because of the slightly smaller area of total engagement with the inertia member as compared with the total engagement with the housing surfaces. Free circulation of viscous damping medium to the substantial shear film spaced working surface at the inner perimeter of the inertia ring member 17 is afforded by respective transverse grooves 33 bypassing the bearing spring members 32.

In view of the optimum tuning and viscous damping capabilities of the dampers of the present invention, the greatest possible crank shaft amplitude reduction for a given flywheel and main mass system is attainable. The tuning afforded by the spring bearings may provide some crank shaft amplitude reduction as compared with the viscous damping alone. The elastomeric bearings enable maximum utilization of the elastic tuning value of viscoelastic damping media. Assuming the main mass to which the damper is attached has four times the damper mass, and assuming a resonant amplitude of 1.0 degree with the optimum or best viscous damper design, a tuned damper having optimum damping will provide an amplitude of 0.67 degree. For the same conditions, a vibration damper having optimum tuning and viscous damping will provide an amplitude of 0.33 degree. Thus, the torsional vibration damper of the present invention having optimum tuning and damping is twice as effective as a merely tuned damper and three times as effective as an optimum viscous damper alone. With the present invention it is possible to choose materials for the damper on the basis of precise measurable parameters. A wide latitude in viscous damping materials is permitted according to the present invention, such as silicone or polyisobutylene, for example, of from 10,000 to 100,000,000 centistokes, which will for any given operating conditions provide the dynamic shear elastic to damping modulus ratio required by the theory of optimumly tuned and damped vibration absorbers. Proportionally, the shear film spacing may be from 0.010 in. to 0.6 in. as required. The precompressed, shear flexible elastomeric bearings provide precise axial and radial inertia mass and housing spacing, and closer control of damper properties. Long bearing life and low shear and frictional forces are attributes of the precompressed, shear flexible elastomeric bearings of small cross-sectional mass although larger than the shear film working gap between the damper members, and the minimum area of contact between the bearings and the housing.

It will be understood that variations and modifications may be effected without departing from the spirit and scope of the novel concepts of this invention.

I claim as my invention:

1. In a vibration damper including relatively movable members comprising an inertia mass and a housing having means for attaching it to a structure subject to vibrations to be damped, and providing a hermetically sealed working chamber therein within which said inertia mass is fully enclosed with viscous damping fluid coupling said members in shear film relation:

shear flexible elastomeric bearing means under precompression between limited confronting areas of said members and slidably frictionally engaging with at least one of said members, providing some elastic shear resistance to relative movement of said members for spring tuning, and enabling stress relief safety relative sliding of at least said one member on said bearing means, while constantly maintaining a shear film spaced relation between said members.

2. A damper according to claim 1, in which said shear flexible elastomeric bearing means comprise a plurality of spaced members located at respective intervals along said damper members within said chamber.

3. A damper according to claim 2, in which the other of said members has sockets therein within which said elastomeric bearing members are held.

4. A damper according to claim 1, in which said inertia mass is a ring shaped member and said chamber is annular complementing the ring shaped member, said elastomeric bearing means being disposed between an inner portion of said ring member and said housing.

5. A damper according to claim 4, in which said elastomeric bearing means are located between axially facing portions of the ring member and the housing as well as inner peripheral portion of the ring member and the housing.

6. A damper according to claim 5 having circumferentially spaced sockets in the inner perimeter of the ring member and separate sockets in the axially facing surfaces of the ring member and said elastomeric bearing means comprising members seated in said sockets and slidably engaging with the housing.

7. A damper according to claim 4, in which said elastomeric bearing means comprise generally ring shaped members between inner reentrant corners of the housing within the working chamber and the inertia ring member.

8. A damper according to claim 7, in which said bearing ring members are of generally O-ring shape in cross-section and said inertia ring member has radially inner chamfered surfaces engaging the bearing rings.

9. A damper according to claim 7, in which the inertia ring member has inner corner grooves in which the bearing ring members are seated.

10. A damper according to claim 7, in which the inertia ring member has inner corners and the bearing ring members are of angular shape complementary to and engaging said corners and within the surfaces of the housing defining the inner corners of the chamber.

11. A damper according to claim 1, in which said damping fluid has viscoelastic characteristics providing elastic tuning as well as viscous damping.

12. A damper according to claim 4, including annular bearing surfaces on said inertia ring member confronting respective reentrant corners of the housing within opposite sides of the radially inner portion of said working chamber, said shear flexible elastomeric bearing means comprising generally ring-shaped members compressed between said bearing surfaces and the surfaces defining said corners, and said inertia ring member having respective bypass notches transversely across said bearing surfaces to assure circulation of the damping fluid to the inner perimeter of the inertia ring member.

References Cited

UNITED STATES PATENTS

| | | | |
|---|---|---|---|
| 3,117,467 | 1/1964 | Paulsen | 74—574 |
| 3,262,334 | 7/1966 | Edwards | 74—574 |
| 3,303,719 | 2/1967 | Beier | 74—574 |
| 3,448,830 | 6/1969 | Desmond | 74—574X |

FRED C. MATTERN, Jr., Primary Examiner

F. D. SHOEMAKER, Assistant Examiner

U.S. Cl. X.R.

188—1